(12) United States Patent
Courage et al.

(10) Patent No.: US 10,010,086 B2
(45) Date of Patent: Jul. 3, 2018

(54) DEVICE AND METHOD FOR SHELLING CRABS

(71) Applicant: Nordischer Maschinenbau Rud. Baader GmbH + Co. KG, Lubeck (DE)

(72) Inventors: Robert D. Courage, Newfoundland Labrador (CA); Thorir Einarsson, Auburn, WA (US); Clinton R. Smith, Lake Placid, FL (US)

(73) Assignee: Nordischer Maschinenbau Rud. Baader GmbH + Co. KG, Lubeck (DE)

( * ) Notice: Subject to any disclaimer, the term of this patent is extended or adjusted under 35 U.S.C. 154(b) by 0 days.

(21) Appl. No.: 15/505,207

(22) PCT Filed: Aug. 20, 2015

(86) PCT No.: PCT/EP2015/069142
§ 371 (c)(1),
(2) Date: Feb. 20, 2017

(87) PCT Pub. No.: WO2016/026930
PCT Pub. Date: Feb. 25, 2016

(65) Prior Publication Data
US 2017/0273321 A1    Sep. 28, 2017

Related U.S. Application Data

(60) Provisional application No. 62/039,751, filed on Aug. 20, 2014.

(51) Int. Cl.
*A22C 29/02*      (2006.01)
*A22C 29/00*      (2006.01)

(52) U.S. Cl.
CPC .......... *A22C 29/025* (2013.01); *A22C 29/005* (2013.01); *A22C 29/023* (2013.01)

(58) Field of Classification Search
CPC ..... A22C 29/00; A22C 29/021; A22C 29/024; A22C 29/025; A22C 29/026
(Continued)

(56) References Cited

U.S. PATENT DOCUMENTS 2,502,091 A    3/1950   Harris et al.
2,771,631 A *  11/1956  Hiller ................... A22C 29/025
                                                            452/10
(Continued)

FOREIGN PATENT DOCUMENTS

RU          2 179 394          2/2002

OTHER PUBLICATIONS

International Preliminary Report on Patentability dated Feb. 21, 2017, in PCT/EP2015/069142, filed Aug. 20, 2015, in German.
(Continued)

*Primary Examiner* — Richard T Price, Jr.
(74) *Attorney, Agent, or Firm* — Spencer Fane LLP

(57) ABSTRACT

A crab butchering machine removes the carapace, mandibles and tail from a crab by timing actuation of tools depending upon the measured dimensions of the carapace. A measuring tool determines the location of the front and rear of the carapace relative to the saddle, securing and advancing the crab through the machine. The positions of the ends of the tools that operate on the crab are known. After measuring, the crab is advanced into a calculated position relative to a first tool, whereby an arm moves upwards, separating the carapace from the crab. The crab is next advanced past a 10 second tool that lifts the carapace away from the crab carcass, allowing a third tool to move upwards, separating the carapace and tail from the carcass when the saddle is in
(Continued)

a second calculated position. The remaining leg clusters are separated and released from the saddle for further processing.

20 Claims, 11 Drawing Sheets

(58) Field of Classification Search
USPC .............................................. 452/1, 12, 173
See application file for complete search history.

(56) References Cited

U.S. PATENT DOCUMENTS

| | | | | |
|---|---|---|---|---|
| 3,151,351 A | * | 10/1964 | Reinke | A22C 29/025 452/1 |
| 3,495,294 A | | 2/1970 | Reinke | |
| 3,596,310 A | | 8/1971 | Trolley | |
| 3,696,465 A | * | 10/1972 | Rossnan | A22C 29/025 452/8 |
| 4,535,507 A | * | 8/1985 | Reinke | A22C 29/025 452/1 |
| 4,715,093 A | | 12/1987 | Lapeyre et al. | |
| 5,401,207 A | | 3/1995 | Hicks et al. | |
| 5,542,877 A | * | 8/1996 | Taylor | A22C 9/00 452/1 |
| 6,099,399 A | * | 8/2000 | Hearn | A22C 29/00 452/1 |
| 6,190,247 B1 | * | 2/2001 | Reimer | A22C 29/021 452/1 |

OTHER PUBLICATIONS

English Translation of International Preliminary Report on Patentability dated Feb. 21, 2017, in PCT/EP2015/069142, filed Aug. 20, 2015.
Search Report dated Mar. 7, 2018, issued in Russian Application 2017106296 by Federal Service for Intellectual Property (ROSPATENT) Federal Institute of Industrial Property (FIPS), 4 pages including English translation.

* cited by examiner

DEVICE AND METHOD FOR SHELLING CRABS

1. FIELD OF THE DISCLOSED SUBJECT-MATTER

The present disclosed subject-matter relates generally to animal butchering apparatuses, and more particularly to a crab butchering apparatus for removing the carapace, mandibles and tail from a crab. More specifically, the invention is concerned with a method and an apparatus for automatically butchering crabs, by separating off the parts containing no meat (such as carapace, mandibles, tail) from the crab and more specifically from the crab carcass of a usually living crab, so that the meat-containing parts (such as leg and shoulder regions) are recovered for further processing. Correspondingly, we can also speak of a method and an apparatus for sectioning crabs.

2. BACKGROUND

The processing of captured ocean crab is largely a manual process. Crabs have a central body mass disposed between a dorsal or top section called a carapace, and a ventral or bottom section called a bone plate. The front end of the crab includes a mouth with mandibles located below. Legs extend laterally from a shoulder area, forming a cluster on each side of the central body mass. Put another way, a crab has a carcass, i.e. a type of base body with the central body mass containing the viscera, on both sides of which the legs are arranged. On the top side, referred to as the back, there is arranged the carapace, which protects the central body mass. On the underside, referred to as the belly, there is arranged the bone plate, which likewise protects the central body mass.

Manual processing of the crab requires a worker to gather and grasp in each hand the legs of the animal adjacent to each shoulder, and orientate the crab, whereby the carapace is facing upwards and the front end is facing away from the worker. The worker thrusts the crab forwards, driving a spike attached to a fixed structure into the mouth of the crab, separating the carapace and viscera. During the same motion, the worker drives his hands downwards, separating each leg duster from the central body mass. The leg clusters and shoulders include desirable meat and are sent on for further processing. The carapace and tail are discarded.

Manually butchering crabs inherently creates inefficiencies that have an impact on productivity and yield. Productivity is affected by the rate at which a worker can process crabs. Yield is effected depending upon the waste left on each shoulder, the meat improperly removed during processing and the legs separated from the clusters. In particular, productivity and quality when butchering crabs are dependent on the individual know-how and experience of the worker. Productivity is furthermore also adversely affected by poor ergonomics.

A crab butchering machine for removing the carapace, mandibles and tail from a crab includes tools that rotate to engage the carapace and tail as the crab passes butchering tools. The crab is held in a saddle by clamping arms on the legs on both sides of the body connected to the conveyor, and the conveyor advances the crabs forwards from the rear of the machine to the tools at the front of the machine. The saddle secures the crab for processing by gripping the legs extending outwards from each side of the carapace with arms, orientating the carapace upwards, and orienting the crab in a forward position. In other words, the crab is clamped by means of clamping arms in or on the saddle with the bone plate downwards, carapace upwards and the legs projecting laterally such that the legs are fixed on both sides, as the crab with its carcass, i.e. the body mass protected by the carapace and bone plate, lies exposed on the saddle, in order to allow the butchering tools access. On the saddle, the crab lies in the clamping position head forwards in the direction of transport T.

The apparatus described in the aforementioned US specification has as butchering means a star wheel that is driven in rotation as the sole butchering tool, rotating about a central axis. The star wheel includes six arms arranged on a shaft, which are distributed uniformly over the periphery of the shaft and extend radially outwards. All six arms are designed identically and have at their free ends a configuration that, as a universal tool, allows removal in particular also of the carapace with the mandibles from the crab carcass, in addition to the tail. For this, the arms are designed at their free ends with a width (transversely to the direction of transport T) in each case ensuring removal of the carapace and hence also of the tail.

The star wheel can be moved out of a retracted position into an advanced position and back again. To butcher the crab, the star wheel rotates continuously about the axis of rotation and with one of its arms in the advanced position first encounters the carapace and removes it as it engages. More precisely, one of the arms grips with its free end in the region of the mandibles beneath the carapace, and tears it from the crab carcass due to the continuing rotation of the star wheel on one hand and the transporting of the crab in the opposite direction on the other hand. Then the star wheel is moved into the retracted position in order to release the crab carcass. Subsequently, the star wheel is moved into the advanced position again, so that one of the arms tears the tail from the crab carcass with its free end due to the rotation of the star wheel.

The known apparatuses and methods for butchering crabs have the disadvantage that they achieve only limited efficacy and yield in recovering meat. Furthermore, the known apparatuses, because of the star wheel with the radially projecting arms, require a large structural form. Owing to the arms being designed in the widest necessary manner in order to remove the carapace, on removing the tail with the identical tool firstly the yield is reduced, since meat from the aforementioned (leg/shoulder) clusters is torn out as well, and on the other hand the end product may be damaged by the sole tool which necessarily has to have large dimensions.

This results in the object of providing a simple and compact apparatus for butchering of crabs in a manner which protects the product that ensures maximum yield and high efficacy. Furthermore, the object is to propose a corresponding method.

The crab first encounters a measuring device that determines the location of the front of the carapace relative to the front of the saddle, and the distance between the front of the carapace and the rear of the carapace. The measurement of each crab in a saddle prior to the crab encountering the tools allows the crab butchering machine to calculate the timing of the movements of the tools to accurately and efficiently remove the carapace and tail from the crab. Put another way, the measuring device ascertains and/or determines the position and/or the size of the crab by ascertaining e.g. the geometry, namely inter alia the length of the carapace from the front, leading, edge to the rear, trailing, edge. With knowledge of this data and information, the tools can be controlled reliably and precisely.

Particularly preferably, an apparatus that achieves this object and that is designed and set up for automatically butchering crabs includes a conveying element with at least one saddle for holding and guiding a crab along a transport path, with a measuring device for ascertaining and/or determining the position and/or the size of the crab and also means for butchering the or each crab being arranged along the transport path in the direction of transport T of the or each crab, and a control unit for controlling the butchering means dependent on the data and information ascertained and/or determined, wherein the apparatus is distinguished in that the butchering means includes at least three separate tools, at least two of which are designed and set up pivotably independent of each other. Due to the fact that three separate tools are provided, each tool can be designed and set up corresponding to its respective functionality in order to increase yield and to allow low-damage or damage-free butchering. Owing to the design according to the invention of the butchering means, furthermore a compact construction is achieved. Furthermore, the independent pivotability of at least two of the at least three tools ensures that an optimised butchering sequence can be achieved when butchering a crab, whereby the productivity (efficacy) of the apparatus is increased.

Advantageously, all three tools of the butchering means are designed and set up pivotably, independent of each other, in each case about an axis I, II, III that extends transversely to the direction of transport T. With individual pivotability of all three tools of the butchering means, even more precise and reliable butchering is ensured.

A preferred development is characterised in that additionally a knife for cutting the bone plate of the crab is arranged in the direction of transport after the butchering means. With this knife, the butchered crab can be divided rapidly and precisely into the two desired leg clusters that have the meat, in order to increase productivity further.

Expediently, the tools of the butchering means are designed differently and can be brought in succession into an operative connection with the crab, such that a step-wise butchering process can be carried out. Owing to the arrangement and design according to the invention of the three tools, efficient and exact butchering is ensured. The different design of the tools is due to their different functionalities, so that maximum yield and maximum protection of the parts of the crab that are to be recovered are ensured.

One particularly advantageous development is characterised in that the first tool of the butchering means that can be brought into an operative connection with the crab is a butchering arm which can be controlled upwards pivotably about an axis I out of a lower waiting position counter to the direction of transport T of the crab and back again, with the butchering arm being designed and set up to detach the carapace and the mandibular arms from the crab carcass. The design and setup of the first tool which is directed exclusively at detaching the carapace guarantees reliable detaching of the carapace from the crab carcass. Put another way, the design and setup of the butchering arm ensure that the carapace is detached reliably and precisely at least partially from the viscera, so that the carapace is lifted relative to the crab carcass. The tool, which has only a single functionality, owing to its pivotability lies in the transport path of the crab, and hence in an operative connection with the crab, only when the butchering operation is necessary. As soon as the butchering operation has been carried out, the tool is out of engagement with the crab, so that the latter can be transported along the transport path in collision-free manner in the direction of the next tool.

Advantageously, the second tool of the butchering means that can be brought into an operative connection with the crab is a carapace horn, which projects into the transport path of the crab such that the carapace horn upon the crab being transported in the direction of transport T can necessarily be introduced between the crab carcass and the detached carapace, with the carapace horn being designed and set up to keep open the distance between the detached carapace and the crab carcass. This alternatively stationary or movable tool ensures in a simple and reliable manner that the gap between the carapace and the crab carcass fixed to the saddle that is formed by the first butchering operation previously described remains opened until the third tool is in an operative connection with the crab. Put another way, the second tool forms a type of placeholder for engaging the third tool. As a result, the butchering operation can be optimised overall, whereby the productivity and yield are increased. Moreover, this embodiment results in a particularly compact structural form of the apparatus.

One particularly preferred embodiment is distinguished in that the third tool of the butchering means that can be brought into an operative connection with the crab is a tail remover which can be controlled upwards pivotably about an axis III out of a lower waiting position counter to the direction of transport T of the crab and back again, with the tail remover being designed and set up to completely separate the carapace and the tail from the crab carcass. This further reinforces the advantages previously mentioned.

An apparatus that is characterised in that the third tool is designed to be smaller in width, i.e. transversely to the direction of transport T of the or each crab, than the first tool, proves particularly expedient. With this individual design of the tools which is adapted to the respective functionality, it is ensured that on one hand in a region or in an operation in which the necessary force and contact surface has to be applied for example when detaching the carapace, a wider tool can be used than in a region or in an operation in which only a low force and contact surface has to be applied for example when separating the tail. As a result, the embodiment according to the invention results in low-damage or damage-free butchering of the crabs being able to be achieved with respect to the (leg/shoulder) cluster to be recovered.

The first tool the crab encounters is the butchering arm. The butchering arm extends rearwards from the front of the machine and moves upwards to separate the carapace and mandibles from the central body mass. As the saddle rotates the crab into engagement with the butchering arm, the front edge of the carapace is moved over the tip of the arm. The measuring device determined the location of the front of the carapace, and calculated when the front edge of the carapace would be positioned over the head of the butchering arm. When the front edge of the carapace reaches a first calculated position, the butchering arm moves rapidly upwards, cleanly detaching the carapace and mandibles from the crab. As the saddle continues to move forwards, the loose carapace remains connected to the rear of the crab, and the carapace encounters a carapace horn extending rearwards from the front of the machine. The carapace horn engages the underside of the carapace, lifting it upwards and away from the crab carcass, allowing the tail remover access to the carcass.

The tail remover removes the carapace and tail from the crab carcass. The tail remover extends rearwards from the front of the machine and moves upwards to separate the carapace and the tail from the crab carcass. As the saddle rotates the crab past the tip of the tail remover, the measuring device determined the location of the rear of the carapace, and calculated when the rear of the carapace would be positioned adjacent to the tip of the tail remover. When the crab reaches the second calculated position, the tail remover moves rapidly upwards, cleanly detaching the carapace and tail from the leg clusters and bone plate. The carapace and tail exit the bottom of the machine.

The legs remain secured in the saddle as the saddle advances the bone plate into engagement with a bone knife that cuts the bone plate, separating the leg clusters into opposite halves. The saddle and halves move towards the rear of the machine, where the clamping arms open, dropping the leg clusters below the machine for further processing.

This object is also achieved by a method according to claim 14 for automatically butchering crabs, comprising the steps: transporting the or each crab in the direction of transport T along a transport path by means of a conveying element, with the or each crab during transport being held and guided on a saddle, ascertaining and/or determining the position and/or the size of the crab by means of a measuring device during transport along the transport path, and subsequently butchering the or each crab by means of a butchering means during transport along the transport path, with the butchering means, dependent on the data and information previously ascertained and/or determined, being controlled by means of a control unit, and is characterised in that the butchering of each crab is carried out by three separate tools, with at least two of the tools being pivoted out of a waiting position into the region of action of the crab and back again in order to carry out the butchering operation.

Advantageously, each of the at least three different tools of the butchering means is in each case brought into an operative connection with each crab to be butchered only a single time. In contrast to the rotating star wheel, in which the same tool comes into contact with the crab several times with its identical arms in order to separate first the carapace and then the tail from the crab carcass, according to the invention each tool is equipped with an individual functionality, so that a separate tool for making contact singularly with the crab is provided for each functionality.

This method is optionally improved in that each of the three tools of the butchering means can in each case be pivoted about its own axis I, II, III that extends transversely to the direction of transport T, out of a waiting position, in which the tool is out of engagement with the crab, into a working position, in which the tool is in engagement with the crab, and back again.

Preferably, the detaching and removal of the carapace, the mandibular arms and also the tail from the crab carcass take place in steps, in that first the carapace and the mandibular arms are detached from the crab carcass by means of a first tool, in particular a butchering arm, and then the carapace and the tail are separated completely from the crab carcass by means of a further tool, in particular a tail remover.

Particularly preferably, the distance between the carapace and the crab carcass produced by detaching the carapace by means of the first tool is held open by a further tool, in particular a carapace horn, until the tool for completely removing carapace and tail is introduced into the distance between the crab carcass and the detached carapace.

Advantageously, all the tools of the butchering means can be controlled individually and independent of each other, with the tools, matched to each other, dependent on the data and information on the position of the crab and/or its size ascertained and/or determined being able to be moved into engagement and out of engagement with the crab.

Preferably, all the tools are kept out of engagement with the crab, in case a situation arises that the measuring device recognises incorrect positioning of the crab on the saddle. This achieves an optimum butchering result for all the crabs.

The resulting advantages have already been described in detail in conjunction with the apparatus according to the invention, which is particularly suited to implementing the method, which is why reference is made to the corresponding passages in order to avoid repetition.

Further expedient and/or advantageous features and developments of the apparatus according to the invention and also preferred method steps of the method according to the invention will become apparent from the dependent claims and the description. A particularly preferred embodiment of the invention will be discussed in greater detail with reference to the appended drawings:

The drawings constitute a part of this specification and include exemplary embodiments of the disclosed subject-matter and illustrate various objects and features thereof.

As required, detailed aspects of the disclosed subject-matter are disclosed herein; however, it is to be understood that the disclosed aspects are merely exemplary of the disclosed subject-matter, which may be embodied in various forms. Therefore, specific structural and functional details disclosed herein are not to be interpreted as limiting, but merely as a basis for the claims and as a representative basis for teaching one skilled in the art how to variously employ the disclosed technology in virtually any appropriately detailed structure.

The features and developments described below represent preferred embodiments, taken individually or in combination with one another. It is expressly pointed out that features that are summarised in the claims and/or the description or are described in a common embodiment may also functionally independently develop the apparatus described further above. The equivalent applies to the method described further below.

Figure 1:
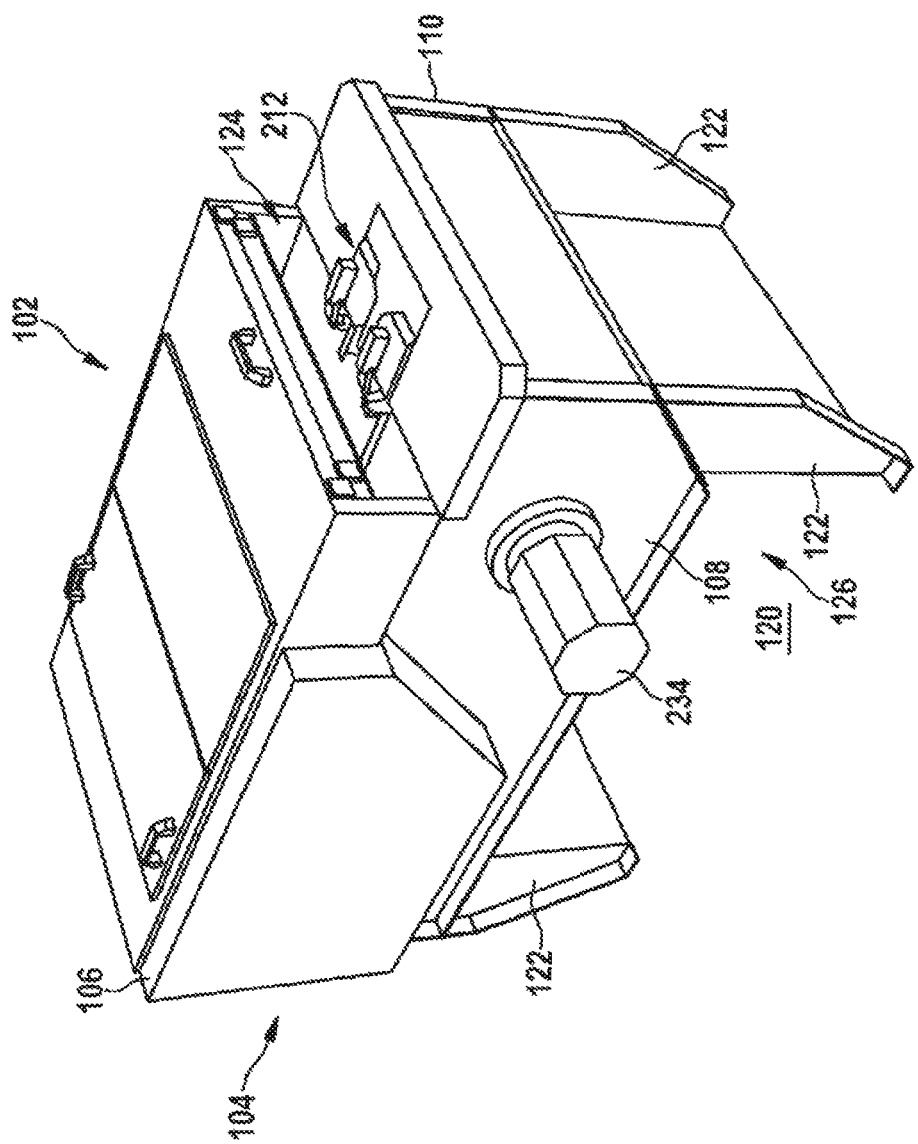
FIG. 1 is a perspective view of a crab butchering machine embodying principles of the disclosed subject-matter.

A crab butchering machine that automates removal of the leg clusters from the body mass increases the number of crabs processed per hour and increases yield of the meat removed from each crab processed. Referring to FIG. 1, a crab butchering machine 102 includes a housing 106 mounted on a frame 104. Stands 122 depending from the frame 104 support the crab butchering machine 102 over a surface 120. In other words, the crab butchering machine 102 (also referred to below as apparatus for automatically butchering crabs) includes the housing 106, which has legs forming the stand 122, so that the housing 106 is arranged at a distance from the floor surface 120 on which the crab butchering machine 102 stands.

A whole crab 152 is introduced into the front of the machine 102 at an inlet 124, and the butchered leg clusters 162 exit the machine 102 at an outlet 126. An operator guides the preferably living crab 152 in the region of the inlet 124 into the apparatus 102, with the leg clusters 162 to be recovered being discharged from the apparatus 102 in the region of the outlet 126. The term "front" depends on the point of view, and may equally well designate the "rear". In other words, the term is interchangeable.

Figure 2:
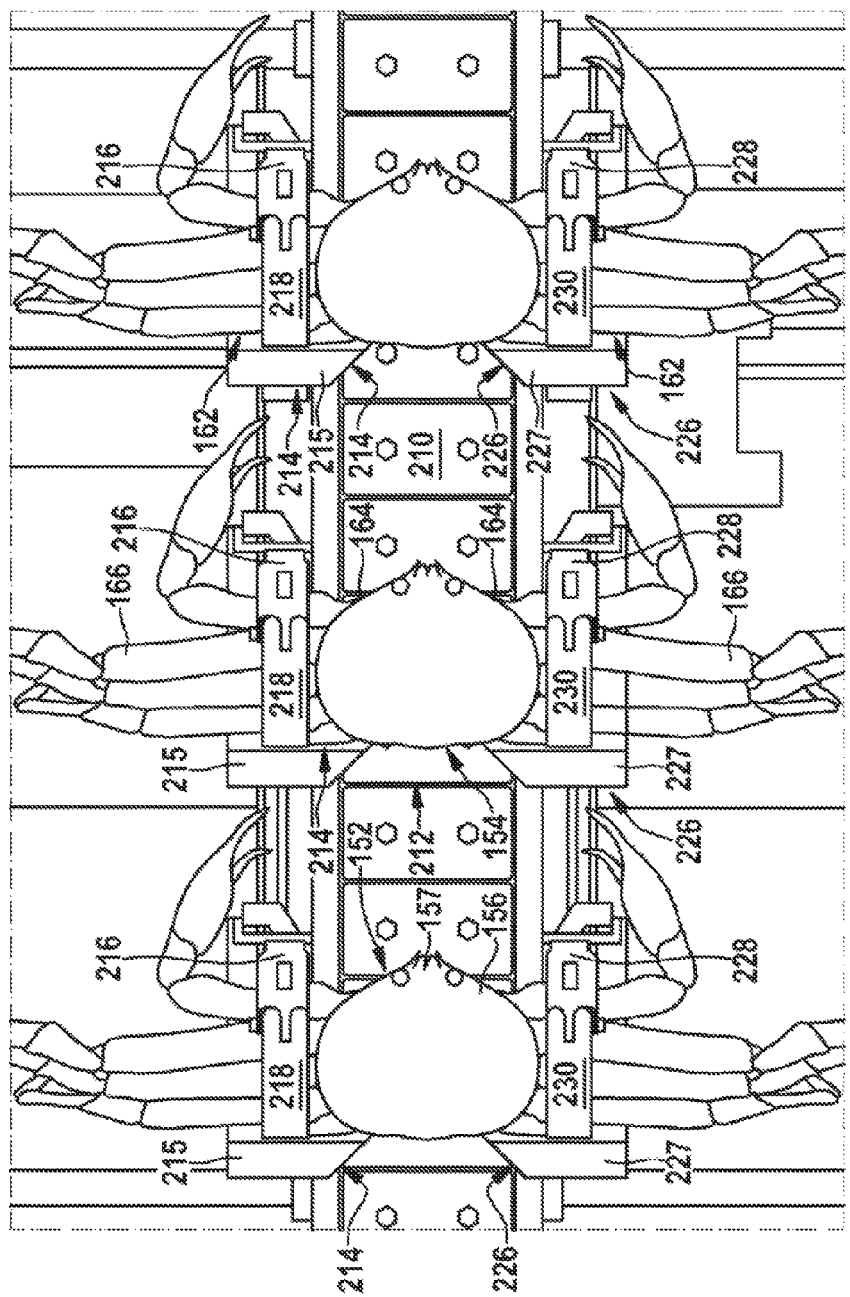
FIG. 2 is a plan view of the conveyor system and crabs in the saddles.

Mechanical operations within the machine 102 separate the leg clusters 162 from the central body mass 154 of the crab 152. Referring to FIG. 2, a conveyor system 202 advances the crab 152 past tools that remove the carapace 156 and tail 160 from the crab 152. The conveyor system 202 includes one or more saddles 212 mounted on a belt system 203. The belt system 203 includes plates 210 mounted on a chain 208 forming a track 211. The track 211 travels about opposing front and rear circular sprockets 204, 205, and the track 211 has an upper tract and a lower tract. In an embodiment, the rear sprocket 205 is mounted on a rear shaft 207. The rear shaft 207 extends between the first and second sidewalls 108, 110, and the shaft 207 is driven by a motor 234 to rotate the rear sprocket 205 relative to the frame 104 at a specific rate of speed. The motor 234 is powered by a suitable power source. In an embodiment, the motor 234 is an electric motor powered by an electrical power source. The front sprocket 204 is mounted on a front shaft 206. The front shaft 206 extends between the first and second sidewalls 108, 110, and is rotatably mounted on the frame 104. Preferably the apparatus 102 accordingly has a revolving conveying chain as conveying element to form the conveyor system 202, which chain is guided endlessly about at least two sprockets 204, 205. The driven (rear) sprocket 205 is arranged in the region of the inlet 124. The entrained (front) sprocket 204 is arranged on the opposite side, remote from the inlet 124. The sprocket 204 faces the butchering means, the tools or free ends of which face the sprocket 204 in the end region.

Thus the conveying chain forms an upper strand, on which the living, not yet butchered crabs 152 are positioned and fixed on the saddle 212 with the carapace 156 pointing upwards and the head forwards, and a lower strand, on which the butchered crabs 152 or the parts of the butchered crab 152 that remain are transported with the bone plate pointing upwards. The sprockets 204, 205 are arranged on the shafts 206, 207, which are mounted on sidewalls 108, 110 of the frame 104, so that the sprockets 204, 205 are rotatable in relation to or relative to the fixed frame 104. The shafts 206, 207 extend substantially horizontally and transversely to the direction of transport T.

The shaft 206 has a zero position extending along a line perpendicular to the shaft 206 upwards through the top of the machine 102, whereby one complete revolution of the shaft 206 moves the centre of two sequential saddles 212 to the zero position. In other words, the distance from the saddle middle of a saddle 212 to the saddle middle of the subsequent saddle 212 corresponds substantially to the periphery of the sprocket 204.

The saddles 212 generally include a platform formed of a first portion 214 and an opposite second portion 226. The crab 152 is placed in the saddle 212 at the rear (or front) of the machine 102 by an operator. The first portion 214 includes a base 215 with a front end 216 having a first arm 218 pivotably attached thereto. The first arm 218 forms a first stop 220 for preventing forward movement of the crab 152. The second portion 226 includes a base 227 with a front end 228 having a second arm 230 pivotably attached thereto. The second arm 230 forms a second stop 232 for preventing forward movement of the crab 152.

The operator places the crab 152 into a saddle 212 by gathering in each hand the legs 166 of the crab 152 adjacent to each shoulder 164 and orientating the crab 152 whereby the carapace 156 is facing upwards and the front end is facing away from the operator. The carapace 156 is positioned between the first and second arms 218, 230, and the carapace 156 is passed between the arms 218, 230, with a cluster of legs 166 passing between the bases 215, 227 and arms 218, 230, securing the crab 152 to the conveyor system 202. The padding 222, 234 secures the legs 166 within the saddle 212 and avoids damage to the legs 166.

Figure 3:
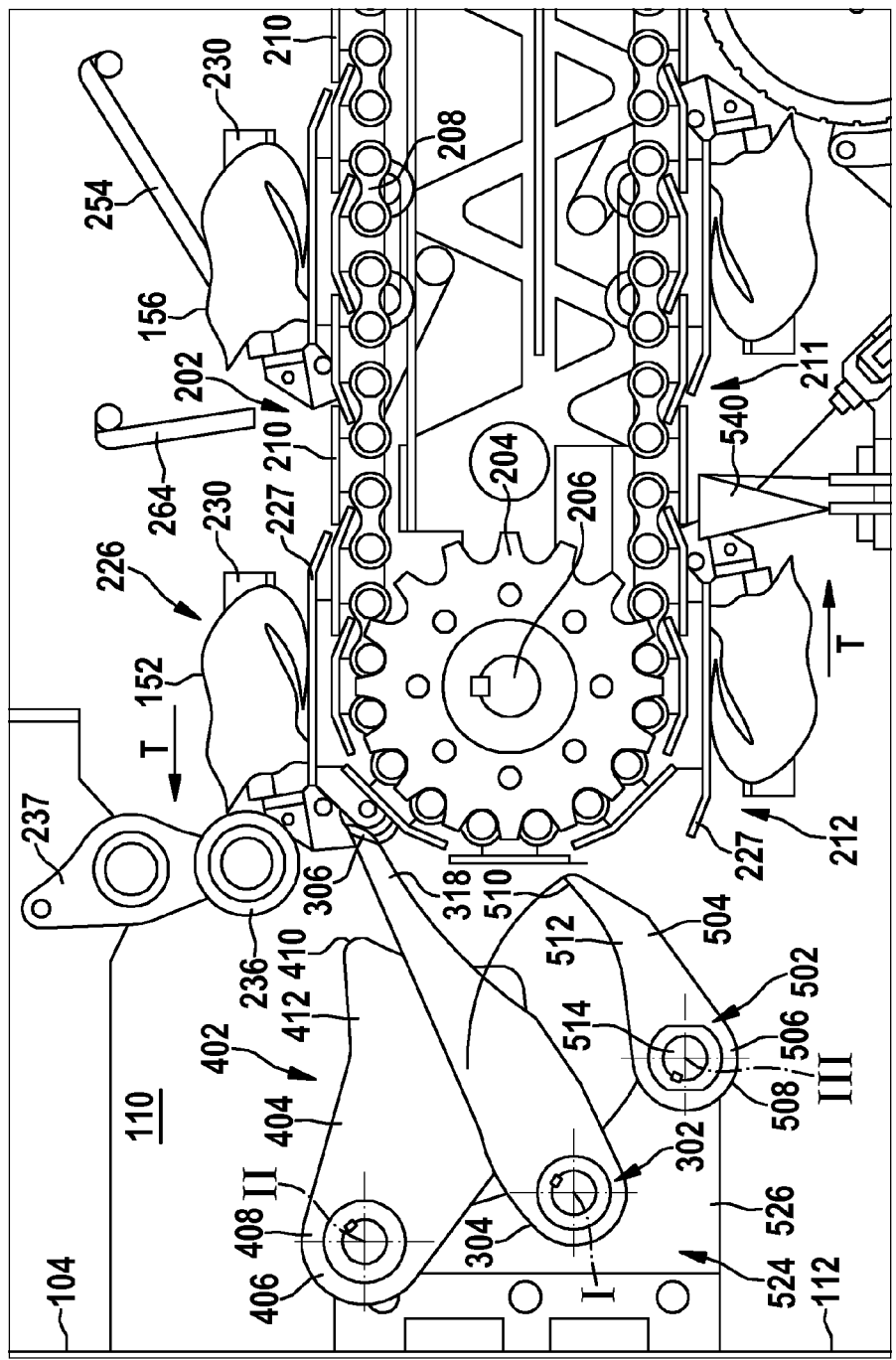
FIG. 3 is a section elevation view of the front of the crab butchering machine.
Figure 4:
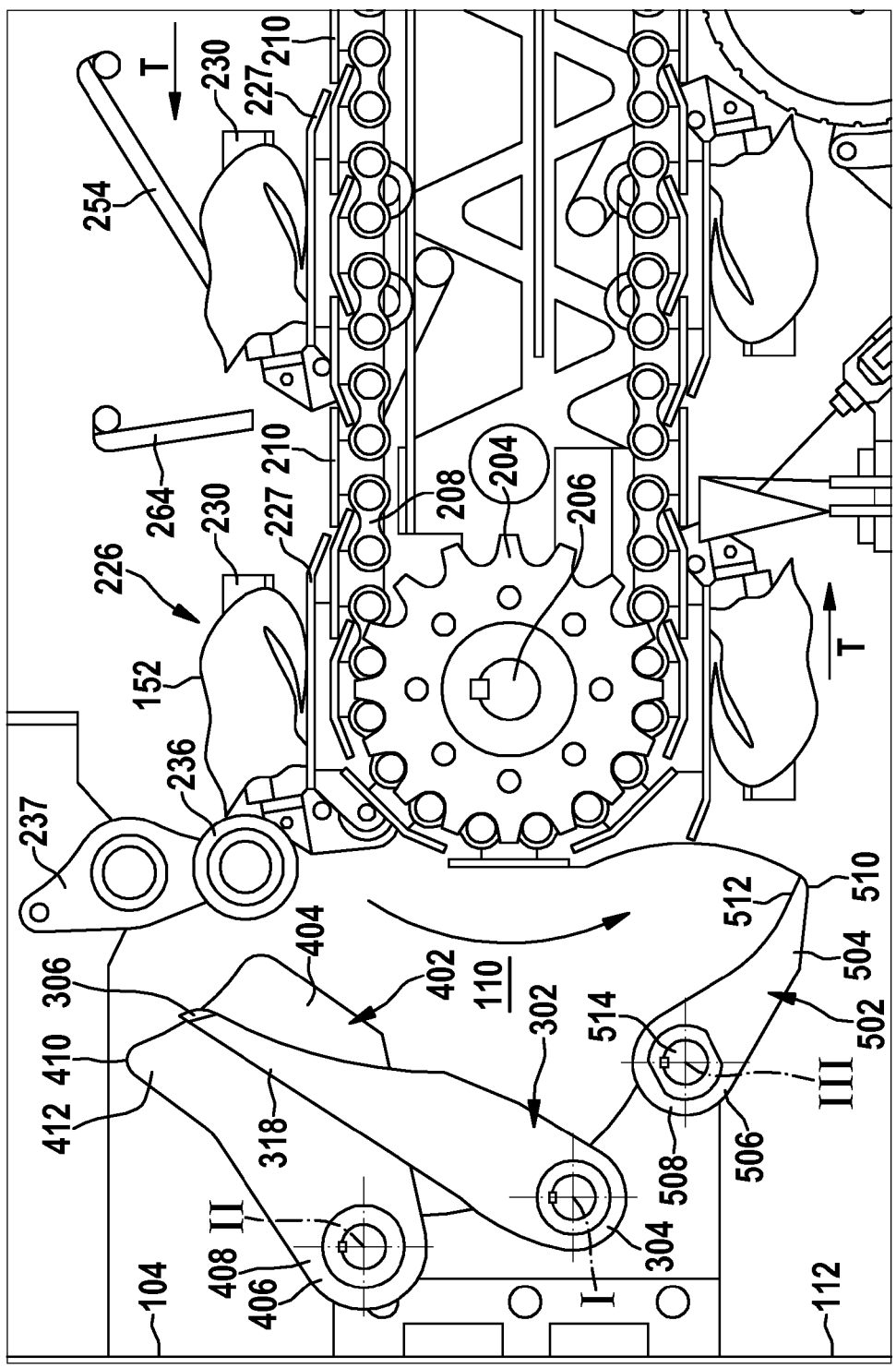
FIG. 4 is a section elevation view of the front of the crab butchering machine.
Figure 5:
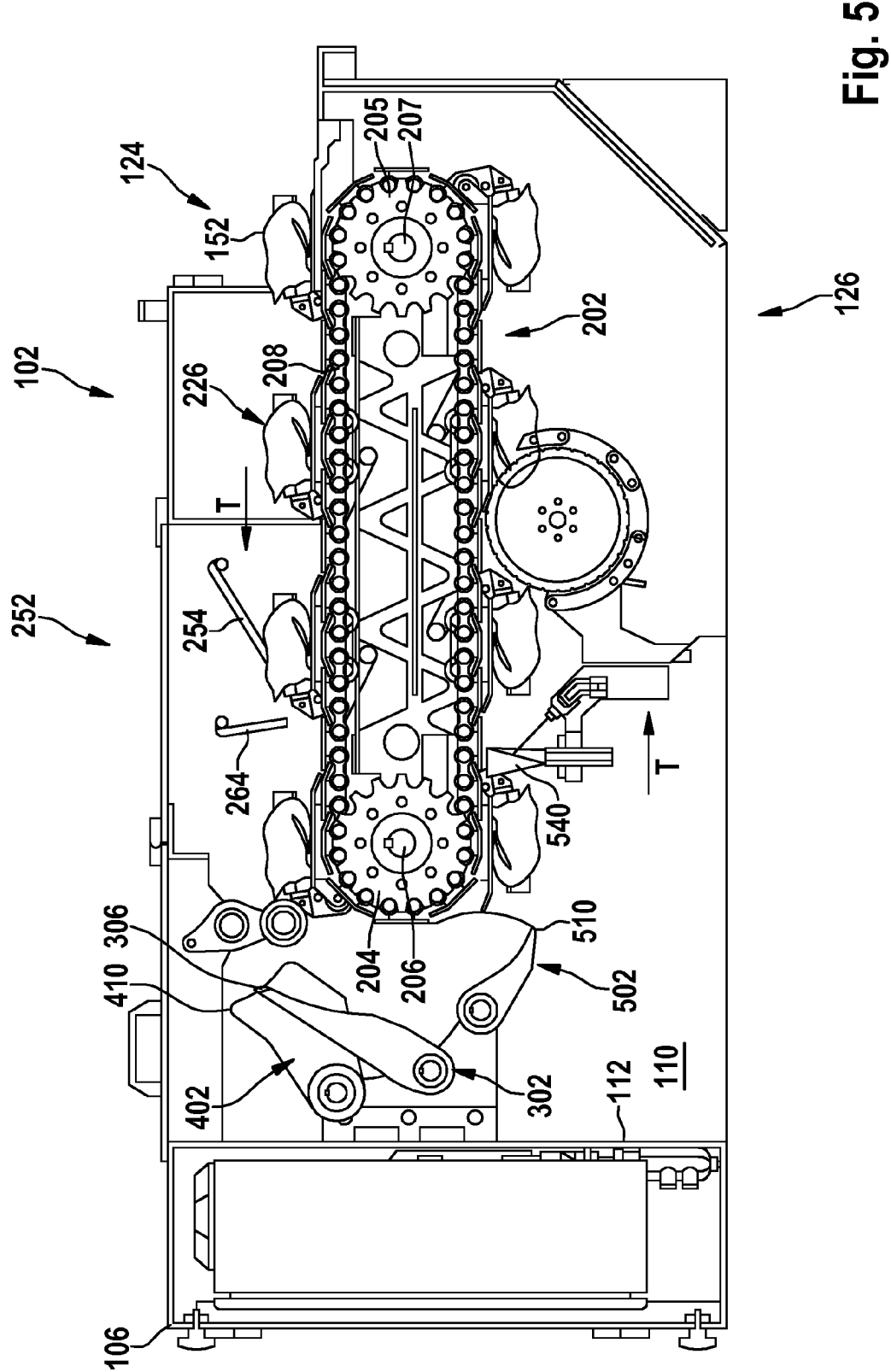
FIG. 5 is a section elevation view of the crab butchering machine.

Referring to FIGS. 3-5, the crab 152 advances towards the tools along the upper tract, first passing through a measuring device 252. The measuring device 252 is arranged in the region of the upper strand. The measuring device 252 serves for ascertaining and/or determining the position and/or the size of the crab 152. The measuring device determines the location of the front and rear edge of the carapace 156 on each saddle 212, and in conjunction with a zero position on the front shaft 206, controls the subsequent movement of the tools to carry out operations on the measured carapace 156. The location of the front of the carapace 156 determines the timing of the action of the tools on the crab 152. In an embodiment, the measuring device 252 uses a first arm 254 to determine the position of the rear of the carapace 156 relative to the zero position and a second arm 264 to determine the position of the front of the carapace 156 relative to the zero position. Each of the first arm 254 and second arm 264 depend downwards from a shaft in front of the path of the crab 152. Each of the arms 254, 264 are of a known length, with a tip a known distance from the shaft. Each of the shafts are a known distance apart. The first arm 254 is used to detect the location of the rear of the carapace 156, and the second arm 264 is used to detect the location of the front of the carapace 156. As the first arm 254 encounters the front of the carapace 156 it pivots forwards about the shaft. As the front of the carapace 156 advances past the first arm 254 and contacts the second arm 264, the second arm 264 pivots forwards about the shaft and the movement of the shaft is registered by a proximity sensor. The timing of when the front of the carapace 156 contacts the second arm 264 and the first arm 254 drops off the rear of the carapace 156 determines the location of the front of the carapace 156 and the rear of the carapace 156 on the saddle 212, and the length of the carapace 156. Alternatively, however, other measuring systems, sensors, cameras or the like may also be used to detect and/or to calculate the position and/or the geometry and in particular the length of the carapace. A control unit (not explicitly illustrated) is provided to control the tools dependent on the data and information which is ascertained and/or determined.

The positions of the ends of the tools at rest located at the end of the machine 102 are known relative to the locations of the shafts of the first and second arms 254, 264 of the measuring device 252, the location of the shaft 206, and the middle of each saddle 212 on the conveyor 202. After the crab 152 encounters the measuring device 252, the saddle 212 advances the crab 152 to the tools. The tools include a butchering arm 302, a carapace horn 402 and a tail remover 502. The butchering means is accordingly arranged in the region of the point of deflection of the conveying chain from the upper strand to the lower strand. In this region, the head of the crab 152 immediately prior to the deflection from the upper strand to the lower strand points in the direction of transport T in the direction of the butchering means arranged on the end face. In other words, the tools of the butchering means are ready in a region of the transport path in which the head of the crab 152 is orientated exposed and free to receive the tools of the butchering means.

The butchering means includes at least three separate tools, at least two of which are designed and set up pivotably independent of each other. Actually, in the embodiment illustrated, precisely three tools form the butchering means. Optionally, two tools are designed and set up pivotably, independent of each other, in each case about an axis I, III, with the axes I, III running transversely to the direction of transport T. Preferably, however, all three tools are designed and set up independent of each other pivotably in each case about an axis I, II, III, with all the axes I, II, III being oriented horizontally and running transversely to the direction of transport T.

As shown in the drawings, the tools of the butchering means are designed and set up differently. The tools can be brought in succession preferably actively, in individual cases e.g. relating to the carapace horn 402 also passively, into an operative connection with the crab 152, such that a step-wise butchering process can be carried out. This means that each tool is configured individually for its specific functionality.

The first tool of the butchering means that can be brought into an operative connection with the crab 152 is the butchering arm 302, which can be controlled upwards pivotably about an axis I out of a lower waiting position counter to the direction of transport T of the crab 152 and back again, with the butchering arm 302 being designed and set up to detach the carapace 156 and the mandibular arms from the crab carcass.

The second tool of the butchering means that can be brought into an operative connection with the crab 152 is the carapace horn 402, which projects into the transport path of the crab 152 such that the carapace horn 402 upon the crab 152 being transported in the direction of transport T can necessarily be introduced between the crab carcass and the detached carapace 156, with the carapace horn 402 being designed and set up to keep open the distance between the detached carapace 156 and the crab carcass.

The third tool of the butchering means that can be brought into an operative connection with the crab 152 is the tail remover 502, which can be controlled upwards pivotably about an axis III out of a lower waiting position counter to the direction of transport T of the crab 152 and back again, with the tail remover 502 being designed and set up to separate the carapace 156 and the tail 160 completely from the crab carcass.

Optionally, the tools of the apparatus 102 differ from each other in particular in the region of their free ends. For example, the third tool, i.e. the tail remover 502, is designed to be smaller in width, i.e. transversely to the direction of transport T of the or each crab 152, than the first tool, i.e. the butchering arm 302.

FIGS. 6-11 show a crab 152 encountering the tools. The crab 152 first encounters the butchering arm 302. The butchering arm 302 separates the carapace 156 and mandibles 157 from the central body mass 154. As a saddle 212 reaches the front of the machine 102 it moves downwards, following the curvature of the front sprocket 204. The first arm 218 passes under a first wheel 224 rotatably connected to a mount 225, and the second arm 230 passes under a second wheel 236 rotatably connected to a mount 237. The wheels 224, 236 hold the crab 152 in the saddle 212, preventing the action of the butchering arm 302 from ejecting the crab 152 from the saddle 212.

The butchering arm 302 extends rearwards from the front of the machine 102 towards the crab 152. The arm 302 extends from a first end 304 to a second end 318, with the second end 318 forming a head 306. The first end 304 pivots about a mount 324 connected to the frame 104. In an embodiment, a connector 326 is attached at one end to the arm 302, and at an opposite end to an actuator for pivoting the arm 302 upwards and downwards about the mount 324. In an embodiment, the actuator is connected to the arm 302 at the mount 324 for moving the arm 302. The head 306 engages the underside of the carapace 156 and the mandibles 157, disconnecting them from the central body mass 154. In an embodiment, the head 306 has an elongated body with a primary extension 308, and a pair of adjacent secondary extensions 310. The primary extension 308 extends upwards from the arm 302 beginning with a broad base terminating in a narrow point. The secondary extensions 310 extend upwards from the arm 302 beginning with a broad base terminating in a narrow point below the height of the tip of the primary extension 308. The primary extension 308 engages the carapace 156, and the secondary extensions 310 engage the mandibles 157 on either side of the mouth.

Figure 6:
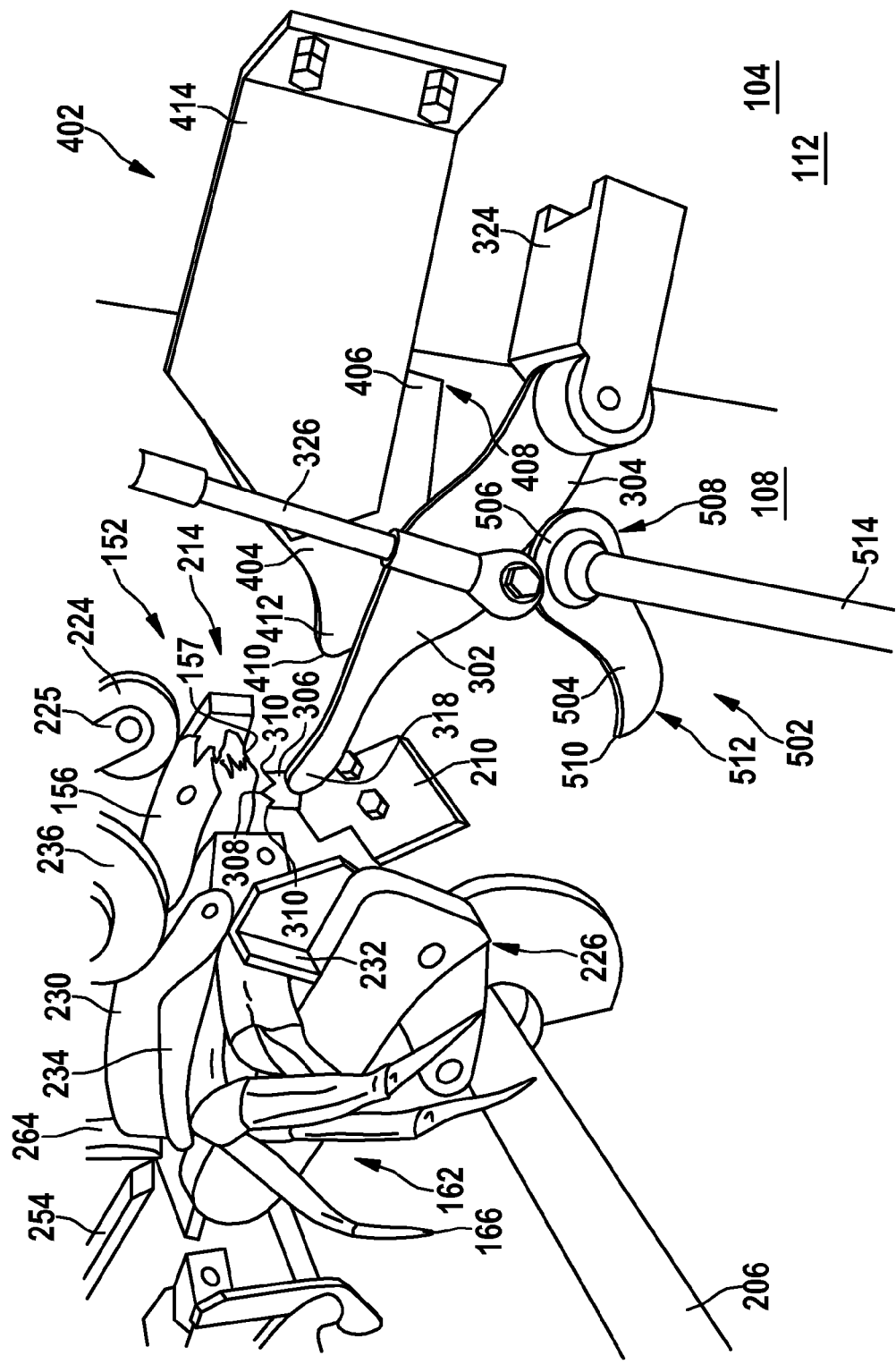
FIG. 6 is a perspective view of a crab in a saddle approaching the butchering arm.

In use, the location of the front of the carapace 156 of the advancing crab 152 is known from the calculation performed by a microprocessor using the measurements of the measuring device 252, the location of the saddle 212 and the rotation of the shaft 206. The butchering arm 302 is in a first position as the saddle 212 begins to move downwards about the front sprocket 204, advancing the carapace 156 over the head 306 (FIG. 6). The location of the head 306 in the first position relative to the saddle 212 is known. When the saddle 212 reaches a first calculated position whereby the carapace 156 is positioned relative to the head 306, the arm 302 moves upwards from the first position (FIGS. 3 and 6) to a second position (FIGS. 4 and 7), engaging the head 306 with the underside of the carapace 156 and the mandibles 157, separating the carapace 156 and mandibles 157 from the central body mass 154. The upward movement of the arm 302 moves the carapace 156 upwards upon the downward movement of the crab 152 carcass. In other words, the butchering arm 302 is pivoted upwards out of the lower waiting position about the pivot axis I exactly once the front edge of the carapace 156 is disposed above the head 306 of the butchering arm 302, so that owing to the opposed motions of the crab 152 on one hand and butchering arm 302 on the other hand the carapace 156 and the mandibular arms 157 are detached and lifted from the crab carcass.

In an embodiment, the mount 324 is movable during operation of the machine 102, allowing the machine 102 to adjust the position of the arm 302 and/or the position of the head 306 independent of the saddle 212 or the location of the front edge of the carapace 156.

Figure 7:
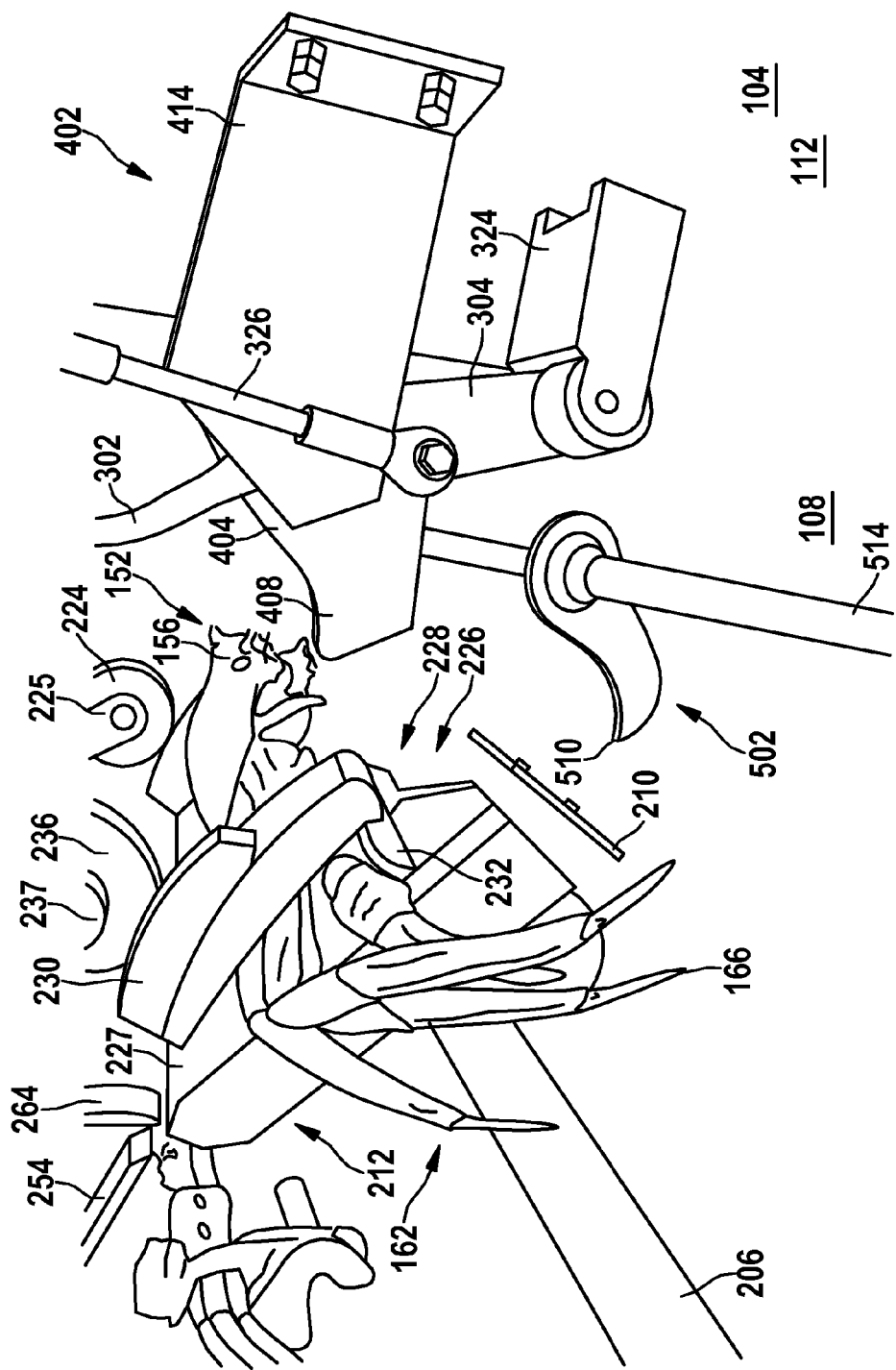
FIG. 7 is a perspective view of a crab carcass after the butchering arm has detached the carapace and mandibles at least partially from the crab.
Figure 8:
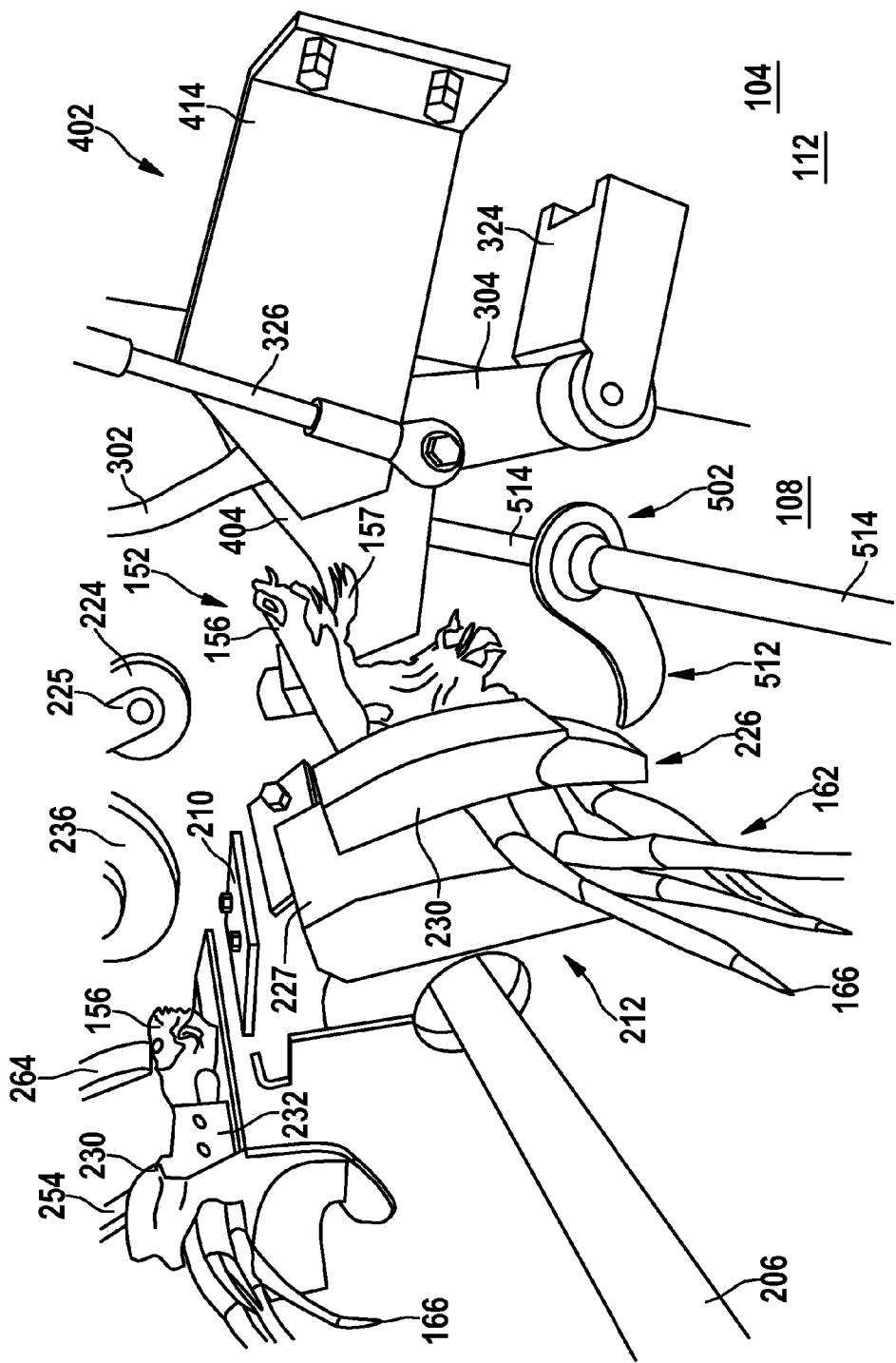
FIG. 8 is a perspective view of a crab carcass with the carapace horn engaging the underside of the carapace.
Figure 9:
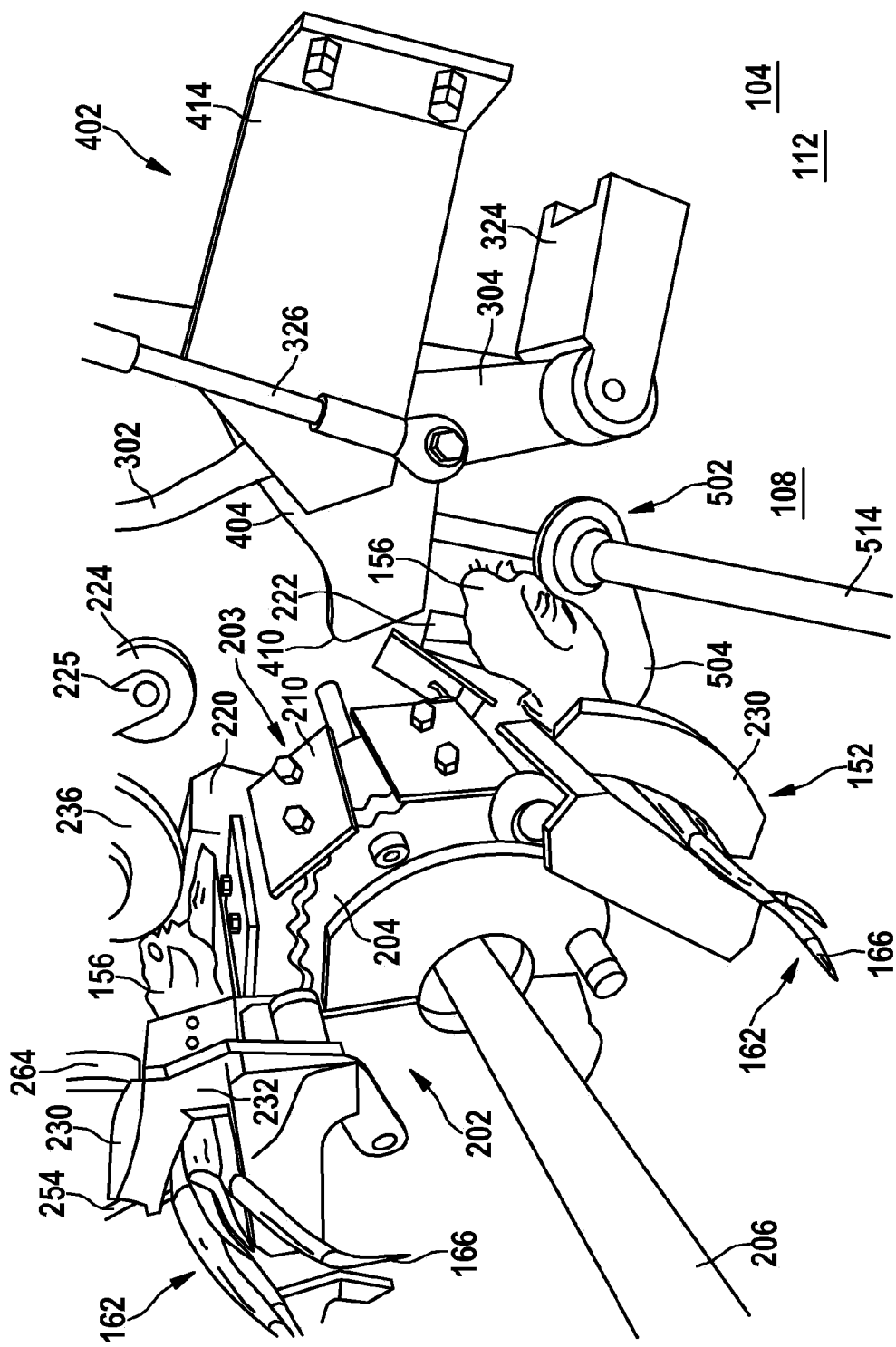
FIG. 9 is a perspective view of a crab carcass approaching the tail remover.
Figure 10:
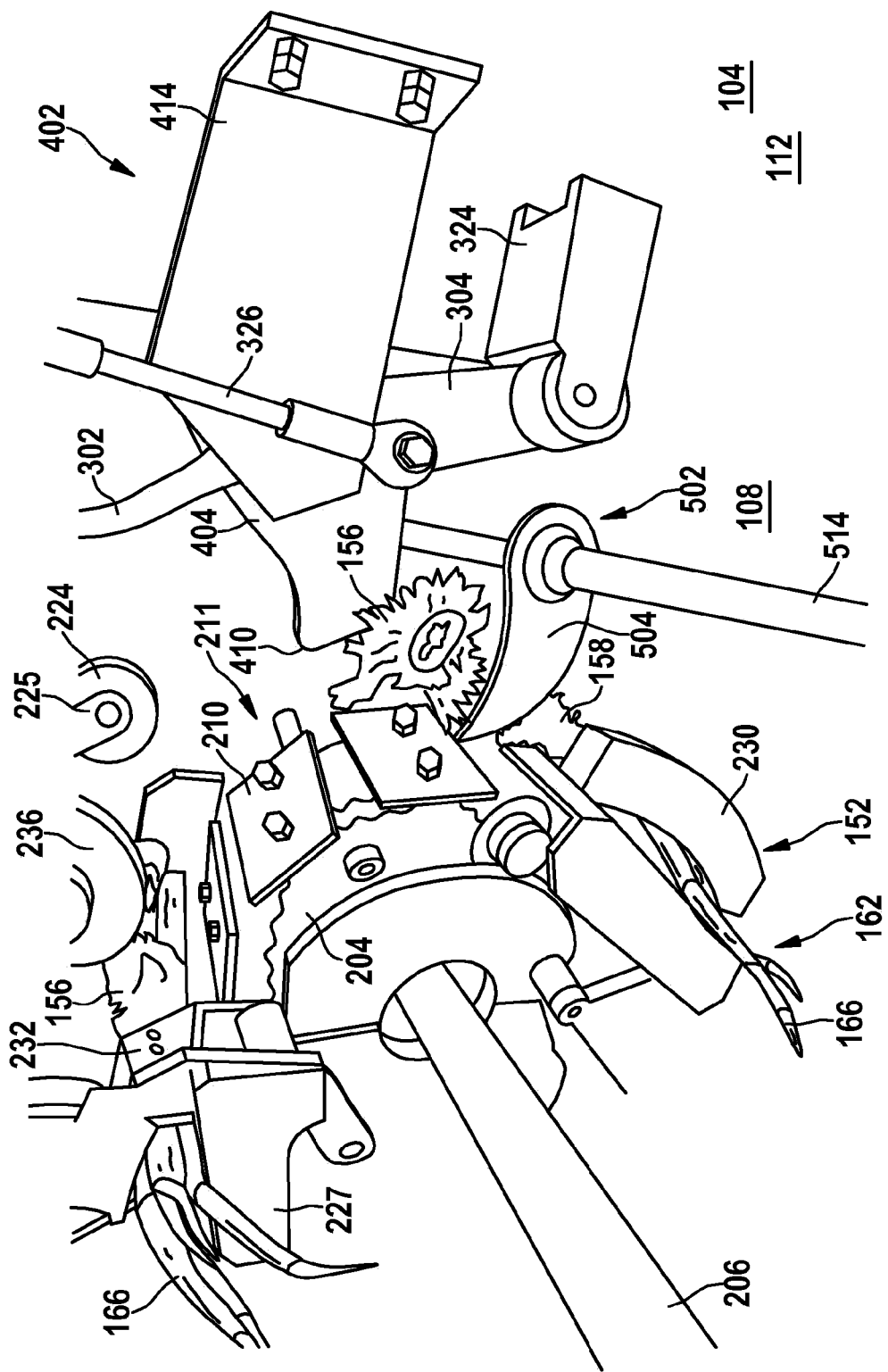
FIG. 10 is a perspective view of a crab carcass after the tail remover has separated the carapace and tail from the carcass.

As the saddle 212 continues to move downwards, the carapace 156 remains connected to the rear of the crab 152 or the tail 160 as the crab 152 carcass encounters the next tool, a carapace horn 402. The carapace horn 402 extends rearwards from the front of the machine 102 towards the crab 152 carcass. The horn 402 includes a body 404 that extends from a base 406 at a first end 408 to a tip 410 at a second end 412. The base 406 is connected to a mount 414, and the mount 414 is connected to the frame 104. As the crab 152 carcass moves downwards, the tip 410 engages the underside of the carapace 156, keeping the carapace 156 lifted up and away from the carcass allowing the next tool, the tail remover 502, access to the carcass (FIGS. 7-8). In other words, the carapace horn 402 projects into the transport path of the crab 152, so that the carapace horn 402 can necessarily be introduced between the crab carcass and the detached carapace 156. The detached carapace 156 lies virtually on the carapace horn 402 and is retained thereby until the third tool has reached the starting position to implement the subsequent butchering operation.

In an embodiment, the carapace horn 402 is fixed in position relative to the frame 104. In an embodiment, the base 406 is pivotably mounted on the frame 104 and connected to an actuator for pivoting the horn 402 upwards and downwards about the frame 104.

Figure 11:
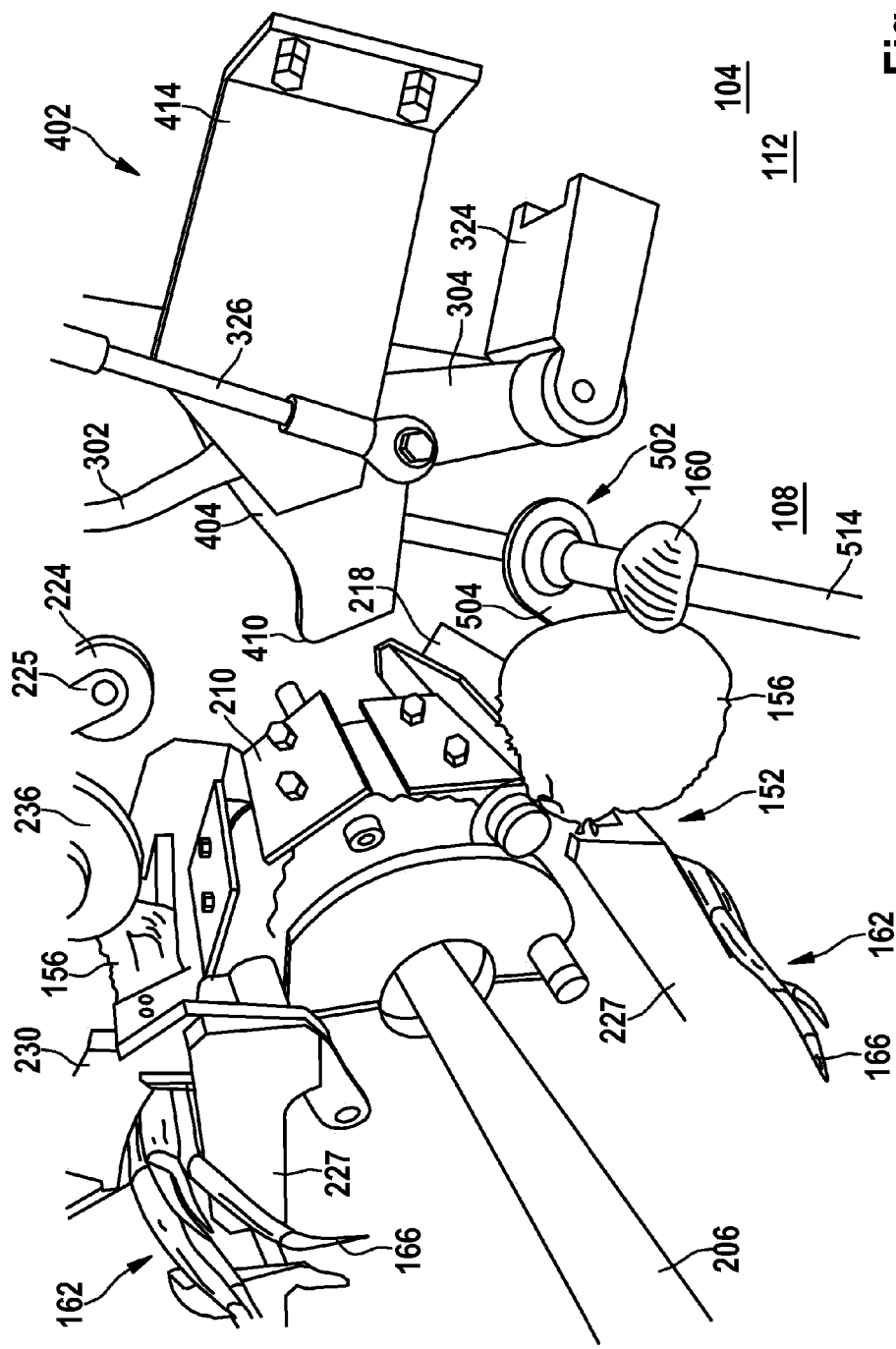
FIG. 11 is a perspective view of a crab carcass with the detached carapace and tail.

As the saddle 212 continues its rotation downwards about the front sprocket 204 a tail remover 502 removes the tail 160 and carapace 156 from the crab 152 carcass. The tail remover 502 extends rearwards from the front of the machine 102 towards the crab 152 carcass. The tail remover 502 includes a body 504 that extends from a base 506 at a first end 508 to a tip 510 at a second end 512. In an embodiment, the base 506 is connected to a shaft 514 extending between the first and second sidewalls 108, 110. The tail remover 502 is in a first position (FIGS. 4 and 9) as the saddle 212 advances the crab 152 carcass past the tip 510. The location of the tip 510 in the first position relative to the saddle 212 is known from the measuring device 252. When the saddle 212 reaches a second calculated position whereby the rear of the carapace 156 is positioned relative to the tip 510, the tail remover 502 moves upwards from the first position to a second position (FIGS. 3 and 10), engaging the tip 510 with the underside of the rear of the carapace 156 and separating the carapace 156 and the tail 160 from the crab 152 carcass. The carapace 156 and tail 160 are thrown free of the crab 152 carcass and exit the bottom of the machine 102 (FIG. 11). Put another way, the tail remover 502 is pivoted upwards about the axis III out of a lower waiting position counter to the direction of transport T of the crab 152, so that owing to the opposed motions of the crab 152 on one hand and the tail remover 502 on the other hand the carapace 156 and the tail 160 are separated completely from the crab carcass. The butchering arm 302 and tail remover 502 once they have carried out their respective butchering operations return to their first positions, namely the original waiting positions, ready for the next crab 152.

In an embodiment, an actuator connected to the shaft 514 moves the tail remover 502 between the first position and second position. In another embodiment, the tail remover 502 is movable during operation of the machine 102, allowing the machine 102 to adjust the position of the tail remover 502 independent of the saddle 212 or the location of the rear of the carapace 156.

In an embodiment, the machine 102 has a universal mount 524 at the front of the machine 102 with an L-shaped bracket 526 for pivotably mounting the butchering arm 302, the carapace horn 402 and the tail remover 502. Each of the abovementioned tools are rotatably mounted on the bracket 526 at their first ends, and each are independently controlled by an actuator for moving the tip of the tool upwards and downwards.

After the carapace 156 and tail 160 are removed, only the leg clusters 162 connected to the bone plate 158 remain. Preferably, additionally a knife for cutting the bone plate 158 of the crab 152 is arranged in the direction of transport T after the butchering means, i.e. in the direction of transport T after the third tool, the tail remover 502. The saddle 212 begins at the lower tract along the conveyor 202 and is advanced towards a bone knife 540 connected to a mount 542. The saddle 212 moves the crab 152 carcass into the knife 540 cutting the bone plate 158, and separating the leg clusters 162 into opposite halves. The saddle 212 continues to advance towards the rear of the machine 102 where the first and second arms 218, 230 open, dropping the leg clusters 162 into a chute below for further processing.

It is to be understood that while certain aspects of the disclosed subject-matter have been shown and described, the disclosed subject-matter is however not limited thereto and encompasses various other embodiments and aspects.

Below, the method principle according to the invention will be explained in greater detail with reference to the drawings:

The method serves for automatically butchering crabs 152. These are transported by means of the conveying element 202 along a transport path in the direction of transport T, namely starting from the inlet 124 first on an upper strand of the conveying element 202. The crabs 152 lie carapace 156 upwards, head forwards, legs 166 on both sides directed at the saddle 212, which holds and guides the crabs 152 during transport. During transport along the transport path, the position and/or the size of the crab 152 is ascertained and/or determined by means of the measuring device 252, preferably in the region of the upper strand. The crabs 152 are further guided past the butchering means, so that each crab 152 during transport along the transport path is butchered by removing the carapace 156 with the mandibles 157 and the tail 160 from the crab carcass. For butchering, the butchering means is controlled by means of a control unit dependent on the data and information previously ascertained and/or determined. First, the carapace 156 and the mandibles 157 are detached from the crab carcass. The mandibles 157 during this operation either remain on the carapace 156 or are completely separated. After this first operation, the carapace 156 however continues to be connected to the crab carcass by the tail 160. Then the carapace 156 with the tail 160 is finally and completely separated from the crab carcass in a further operation.

Each crab 152 is thus measured individually, and the control unit of the apparatus 102 determines the chronological sequence of the tools of the butchering means in the butchering process. According to the invention, the butchering of each crab 152 is carried out by three separate tools, with at least two of the tools being pivoted out of a waiting position into the region of action of the crab 152 and back again to carry out the butchering operation. In the butchering process, preferably each of the at least three different tools of the butchering means is in each case brought into an operative connection with each crab 152 to be butchered only a single time. The detaching and removal of the carapace 156, the mandibular arms (mandibles) 157 and also the tail 160 from the crab carcass take place, as has been mentioned, in steps, in that first the carapace 156 and the mandibular arms 157 are detached from the crab carcass by means of a first tool, in particular a butchering arm 302, and then the carapace 156 and the tail 160 are separated completely from the crab carcass by means of a further tool, in particular a tail remover 502. The distance between the carapace 156 and the crab carcass produced by detaching the carapace 156 by means of the first tool is held open by a further tool, in particular a carapace horn 402, until the tool for completely removing carapace 156 and tail 160, namely the tail remover 502, is introduced into the distance between the crab carcass and the detached carapace 156.

All the tools of the butchering means can be controlled individually and independent of each other, with the tools, matched to each other, dependent on the data and information on the position of the crab 152 and/or its size which is ascertained and/or determined being able to be moved into engagement and out of engagement with the crab 152. Particularly preferably, each of the three tools of the butchering means, i.e. not only the butchering arm 302 and the tail remover 502, but also the carapace horn 402, can in each case be pivoted about its own axis I, II, III, which extends transversely to the direction of transport T, out of a waiting position, in which the tool is out of engagement with the crab 152, into a working position, in which the tool is in engagement with the crab 152, and back again.

As mentioned, the measuring device 252 detects the position and/or the size of each crab 152. In the event that the crab 152, because of its size and/or because it is inadequately positioned on the saddle 212, cannot be optimally butchered, i.e. in particular incorrect positioning is recognised, the three tools are controlled by means of the control unit such that the crab 152 in question is transported through the apparatus 102 without processing or butchering. More precisely, the butchering arm 302 and the tail remover 502 are held in the waiting position, i.e. are not activated. The carapace horn 402 is moved out of the region of action in order to avoid the crab 152 encountering the carapace horn 402.

The invention claimed is:

1. A crab butchering apparatus for removing the carapace, mandibles and tail from a crab, comprising: a saddle for retaining the crab, a movable first arm for engaging the front of the carapace and separating the carapace and mandibles from the crab, a second arm for lifting the carapace away from the crab carcass, and a movable third arm for engaging the rear of the carapace and separating the carapace and tail from the crab.

2. An apparatus according to claim 1, further comprising: a measuring device for determining the location of the front and rear of the carapace relative to the saddle, and wherein the ends of the first, second and third arms that engage the carapace are known relative to the location of the measuring device.

3. An apparatus according to claim 2, further comprising: a microprocessor connected to the measuring device, a first actuator connected to the first arm and the microprocessor, a second actuator connected to the third arm and the microprocessor, wherein the saddle advances the crab to the first and second arms, wherein the microprocessor actuates the first actuator, engaging the first arm with the carapace when the saddle is in a first position relative to the first arm, and wherein the microprocessor actuates the second actuator, engaging the third arm with the carapace when the saddle is in a second position relative to the third arm.

4. An apparatus according to claim 3, further comprising: a third actuator connected to the second arm and the microprocessor, wherein the second arm is movable for engaging the carapace, and wherein the microprocessor actuates the third actuator engaging the second arm with the carapace.

5. An apparatus according to claim 2, wherein the measuring device comprises: a first measuring arm connected to a shaft, wherein the first arm depends downwards in front of the crab, a second measuring arm connected to a shaft, wherein the second arm depends downwards in front of the crab, wherein the carapace is advanced into engagement with the first measuring arm and the second measuring arm, and movement of the first and second measuring arms determines the location of the front and rear of the carapace relative to the saddle; and wherein the crab is advanced whereby the first measuring arm is disengaged from the carapace, determining the location of the rear of the carapace relative to the saddle.

6. An apparatus, designed and set up for automatically butchering crabs, comprising: a conveying element with at least one saddle for holding and guiding a crab along a transport path, with a measuring device for ascertaining and/or determining the position and/or the size of the crab and also means for butchering each crab being arranged along the transport path in the direction of transport T of the or each crab, and a control unit for controlling the butchering means dependent on the data and information which is ascertained and/or determined, characterised in that the butchering means includes at least three separate tools, at least two of which are designed and set up pivotably independent of each other.

7. An apparatus according to claim 6, characterised in that the all three tools of the butchering means are designed and set up pivotably, independent of each other, in each case about an axis I, II, III that extends transversely to the direction of transport T.

8. An apparatus according to claim 6, characterised in that additionally a knife for cutting the bone plate of the crab is arranged in the direction of transport after the butchering means.

9. An apparatus according to claim 6, characterised in that the tools of the butchering means are designed differently and can be brought in succession into an operative connection with the crab, such that a step-wise butchering process can be carried out.

10. An apparatus according to claim 6, characterised in that the first tool of the butchering means that can be brought into an operative connection with the crab is a butchering arm which can be controlled upwards pivotably about an axis I out of a lower waiting position and back again counter to the direction of transport T of the crab, with the butchering arm being designed and set up to detach the carapace and the mandibular arms from the crab carcass.

11. An apparatus according to claim 6, characterised in that the second tool of the butchering means that can be brought into an operative connection with the crab is a carapace horn which projects into the transport path of the crab such that the carapace horn upon the crab being transported in the direction of transport T can necessarily be introduced between the crab carcass and the detached carapace, with the carapace horn being designed and set up to keep open the distance between the detached carapace and the crab carcass.

12. An apparatus according to claim 6, characterised in that the third tool of the butchering means that can be brought into an operative connection with the crab is a tail remover which can be controlled upwards pivotably about an axis III out of a lower waiting position counter to the direction of transport T of the crab and back again, with the tail remover being designed and set up to completely separate the carapace and the tail from the crab carcass.

13. An apparatus according to claim 12, characterised in that the third tool is designed to be smaller in width, transversely to the direction of transport T of the or each crab, than the first tool.

14. A method for automatically butchering crabs, comprising the steps:
transporting a crab in the direction of transport T along a transport path by a conveying element,
with the crab during transport being held and guided on a saddle, ascertaining and/or determining the position and/or the size of the crab by a measuring device during transport along the transport path, and subsequently butchering the crab by a butchering means during transport along the transport path, with the butchering means, dependent on data and information previously ascertained and/or determined, being controlled by means of a control unit, characterised in that the butchering of each crab is carried out by three separate tools, with at least two of the tools to carry out the butchering operation being pivoted out of a waiting position into the region of action of the crab and back again.

15. A method according to claim 14, characterised in that each of the at least three different tools of the butchering means is in each case brought into an operative connection with each crab to be butchered only a single time.

16. A method according to claim 14, characterised in that each of the three tools of the butchering means can in each case be pivoted about its own axis I, II, III that extends transversely to the direction of transport T, out of a waiting position, in which the tool is out of engagement with the crab, into a working position, in which the tool is in engagement with the crab, and back again.

17. A method according to claim 14, characterised in that the detaching and removal of the carapace, the mandibular arms and also the tail from the crab carcass take place in steps, in that first the carapace and the mandibular arms are detached from the crab carcass by a first tool, in particular a butchering arm, and then the carapace and the tail are separated completely from the crab carcass by a further tool, in particular a tail remover.

18. A method according to claim 17, characterised in that the distance between the carapace and the crab carcass produced by detaching the carapace by the first tool is held open by a further tool, in particular a carapace horn, until the tool for completely removing carapace and tail is introduced into the distance between the crab carcass and the detached carapace.

19. A method according to claim 14, characterised in that all the tools of the butchering means can be controlled individually and independent of each other, with the tools, matched to each other, dependent on the data and information on the position of the crab and/or its size which is ascertained and/or determined being able to be moved into engagement and out of engagement with the crab.

20. A method according to claim 14, characterised in that all the tools, in the event that the measuring device recognises incorrect positioning of the crab on the saddle, are kept out of engagement with the crab.

* * * * *